US010763942B2

(12) United States Patent
Shi et al.

(10) Patent No.: US 10,763,942 B2
(45) Date of Patent: Sep. 1, 2020

(54) METHODS AND DEVICES FOR BEAM SELECTION

(71) Applicant: Telefonaktiebolaget LM Ericsson (publ), Stockholm (SE)

(72) Inventors: Cong Shi, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 15/573,074

(22) PCT Filed: May 12, 2015

(86) PCT No.: PCT/CN2015/078802
§ 371 (c)(1),
(2) Date: Nov. 9, 2017

(87) PCT Pub. No.: WO2016/179804
PCT Pub. Date: Nov. 17, 2016

(65) Prior Publication Data
US 2018/0123675 A1    May 3, 2018

(51) Int. Cl.
*H04B 7/06*  (2006.01)
*H04W 72/12* (2009.01)
(Continued)

(52) U.S. Cl.
CPC ........ *H04B 7/0695* (2013.01); *H04W 72/046* (2013.01); *H04W 72/1226* (2013.01)

(58) Field of Classification Search
CPC ............. H04B 7/0695; H04W 72/046; H04W 72/1226
See application file for complete search history.

(56) References Cited

U.S. PATENT DOCUMENTS

2008/0253297 A1   10/2008  Hulbert
2010/0033374 A1*  2/2010  van Rensburg ........ H01Q 1/246
                                                   342/368

(Continued)

FOREIGN PATENT DOCUMENTS

CN      101448323 A    6/2009
CN      101778479 A    7/2010
(Continued)

OTHER PUBLICATIONS

PCT Notification of Transmittal of the International Search Report and the Written Opinion of the International Searching Authority, or the Declaration for International application No. PCT/CN2015/078802—dated Feb. 14, 2016.

(Continued)

*Primary Examiner* — Shukri Taha
*Assistant Examiner* — Jay L Vogel
(74) *Attorney, Agent, or Firm* — Sage Patent Group

(57) ABSTRACT

One embodiment of the present disclosure relates to a method for use in a terminal device. The method comprises: obtaining signal quality measurements of plural beams; and selecting at least one serving beam from the plural beams depending upon the obtained signal quality measurements and scheduling constraint information of the plural beams. The embodiments of the present disclosure also relates to relevant radio access node device. When selecting or reselecting a serving beam for a terminal device, the scheduling constrains applied on the beams/links can be taken into consideration, which may allow an mmW network operating the link-specific coordination to control the probability that a terminal device is served by a coordinated beam on constrained radio resources at a lower level as possible.

6 Claims, 10 Drawing Sheets

(51) Int. Cl.
*H04W 72/04* (2009.01)
*H04W 16/28* (2009.01)
*H04B 7/08* (2006.01)

(56) References Cited

U.S. PATENT DOCUMENTS

| | | | |
|---|---|---|---|
| 2010/0210219 A1 | 8/2010 | Stirling-Gallacher et al. | |
| 2011/0085448 A1* | 4/2011 | Kuwahara | H04W 16/10 370/242 |
| 2014/0073337 A1 | 3/2014 | Hong et al. | |
| 2014/0099983 A1* | 4/2014 | Sarca | H04W 72/08 455/501 |
| 2014/0256327 A1 | 9/2014 | Wang et al. | |
| 2015/0173049 A1* | 6/2015 | Chen | H04W 72/082 370/329 |
| 2015/0289281 A1* | 10/2015 | Kim | H04L 5/0023 375/267 |
| 2017/0006613 A1* | 1/2017 | Kakishima | H04B 7/0413 |
| 2018/0063826 A1* | 3/2018 | Kim | H04B 7/0413 |

FOREIGN PATENT DOCUMENTS

| | | |
|---|---|---|
| CN | 102301773 A | 12/2011 |
| CN | 102571177 A | 7/2012 |
| CN | 102647723 A | 8/2012 |
| CN | 102685915 A | 9/2012 |
| CN | 103313408 A | 9/2013 |
| WO | 2010 020063 A1 | 2/2010 |
| WO | 2014 042562 A1 | 3/2014 |

OTHER PUBLICATIONS

Patent Search Report issued by the State Intellectual Property Office of the People's Republic of China for Application No. 2015800017005—dated May 12, 2015.

Extended European Search Report for Application No./Patent No. 15891507.4-1215 / 3295737 PCT/CN2015078802—dated Apr. 26, 2018.

Second Office Action issued by the State Intellectual Property Office of the People's Republic of China for Application No. 201580001700.5 (English translated search report and Summary attached)—dated Sep. 29, 2018.

* cited by examiner

METHODS AND DEVICES FOR BEAM SELECTION

PRIORITY

This nonprovisional application is a U.S. National Stage Filing under 35 U.S.C. § 371 of International Patent Application Serial No. PCT/CN2015/078802 filed May 12, 2015, and entitled "Methods And Devices For Beam Selection."

TECHNICAL FIELD

The present disclosure generally relates to wireless communication, particularly to methods and devices for beam selection.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband continues to drive a demand for higher overall traffic capacity and a higher achievable end-user data rate in a radio access network. Several application scenarios in the future will require data rates up to 10 Gbps in local areas. The demand for very high system capacity and very high end-user date rates may be met by networks where a distance between access nodes ranges from a few meters in indoor deployments up to roughly 50 m in outdoor deployments, i.e. with an infra-structure density considerably higher than the densest networks of today. The wide transmission bandwidth required for providing a data rate up to 10 Gbps and above may only be obtained from spectrum allocations in the millimeter-wave (mmW) band. High-gain beamforming, typically realized with array antennas, may be used to mitigate the increased path loss at higher frequencies.

MmW networks have a number of properties that, generally speaking, make operations under the shared spectrum promising. Due to a small antenna size at high frequencies, mmW networks heavily rely on high-gain beamforming, which enables significantly higher resource reuse and alleviate interference between multiple networks. In the meanwhile, interference in mmW networks may become link-specific or beam-specific rather than user-specific as in a traditional wireless cellular system. In order to handle the interference in mmW networks, the radio resource needs to be coordinated on a link/beam basis, which may be so-called "link-specific coordination". Under such coordination, some interfering links/beams may be scheduled on constrained radio resources so that interfering transmissions do not or at least less probably end up on the same radio resources.

SUMMARY

However, in the link-specific coordination, links/beams scheduled on constrained radio resources in fact suffer from loss of transmission opportunity on the constrained radio resources, which may lead to throughput loss from both specific terminal and whole network perspectives.

One or more method and apparatus embodiments according to the present disclosure aim to provide one or more solutions for beam selection or reselection, thereby reducing potential throughput loss resulted from the link-specific coordination of scheduling links/beams on constrained radio resources.

According to the first aspect of the present disclosure, there is provided a method for use in a terminal device. The method comprises: obtaining signal quality measurements of plural beams; and selecting at least one serving beam from the plural beams depending upon the obtained signal quality measurements and scheduling constraint information of the plural beams.

According to one or more embodiments of the first aspect of the present disclosure, if the scheduling constraint information of a beam indicates that the beam has a scheduling constraint, the beam may be scheduled on constrained radio resources thereby coordinating with at least one interfering beam. According to one or more embodiments of the first aspect of the present disclosure, a serving beam may be selected from the plural beams at least partially based on a predefined criterion that the serving beam has a largest signal quality measurement among the beams having no scheduling constraint.

According to the second aspect of the present disclosure, there is provided a method for operating a radio access node device. The method comprises: sending to a terminal device a configuration signaling indicating scheduling constraint information of plural beams transmitted by the radio access node device; and communicating with the terminal device over a serving beam selected by the terminal device from the plural beams.

According to one or more embodiments of the second aspect of the present disclosure, the serving beam may be selected from the plural beams by the terminal device depending upon signal quality measurements and scheduling constraint information of the plural beams. According to one or more embodiments of the second aspect of the present disclosure, if the scheduling constraint information of a beam indicates that the beam has a scheduling constraint, the beam may be scheduled on constrained radio resources thereby coordinating with at least one interfering beam.

According to the third aspect of the present disclosure, there is provided a method for use in a radio access node device. The method comprises: receiving from a terminal device a report message indicating signal quality measurements of plural beams received by the terminal device; determining whether or not to switch the terminal device from at least one current serving beam to at least one new serving beam, depending upon scheduling constraint information of the plural beams and the signal quality measurements reported by the terminal device; and informing the terminal device of the at least one new serving beam, in response to determining that the terminal device is switched to the at least one new serving beam.

According to one or more embodiments of the third aspect of the present disclosure, if the scheduling constraint information of a beam indicates that the beam has a scheduling constraint, the beam is scheduled on constrained radio resources thereby coordinating with at least one interfering beam. According to one or more embodiments of the third aspect of the present disclosure, it may be determined that the terminal device is switched to a new serving beam, if the new serving beam satisfies a predefined criterion that the new serving beam has a largest signal quality measurement among the beams having no scheduling constraint. According to one or more alternative or additional embodiments, it may be determined that the terminal device is switched to multiple serving beams at least partially based on a predefined criterion that the multiple serving beams are scheduled on their constrained radio resources that are orthogonal with one another.

According to the fourth aspect of the present disclosure, there is provided a terminal device. The terminal device comprises: an obtaining unit configured to obtain signal quality measurements of plural beams; and a selecting unit configured to select at least one serving beam from the plural beams depending upon the obtained signal quality measurements and scheduling constraint information of the plural beams.

According to one or more embodiments of the fourth aspect of the present disclosure, the selecting unit may be configured to select a serving beam from the plural beams at least partially based on a predefined criterion that the serving beam has a largest signal quality measurement among the beams having no scheduling constraint. According to one or more embodiments of the fourth aspect of the present disclosure, the terminal device may further comprise: a receiving unit configured to receive a configuration signaling transmitted from a radio access node device, wherein the configuration signaling indicates the scheduling constraint information of the beams.

According to the fifth aspect of the present disclosure, there is provided a radio access node device. The radio access node device comprises: a sending unit configured to send to a terminal device a configuration signaling indicating scheduling constraint information of plural beams transmitted by the radio access node device; and a controlling unit configured to control the radio access node device to communicate with the terminal device over a serving beam selected by the terminal device from the plural beams.

According to the sixth aspect of the present disclosure, there is provided a radio access node device. The radio access node device comprises: a receiving unit configured to receive from a terminal device a report message indicating signal quality measurements of plural beams received by the terminal device; a determining unit configured to determine whether or not to switch the terminal device from at least one current serving beam to at least one new serving beam, depending upon scheduling constraint information of the plural beams and the signal quality measurements reported by the terminal device; and an informing unit configured to inform the terminal device of the at least one new serving beam, in response to determining that the terminal device is switched to the at least one new serving beam.

According to one or more embodiments of the sixth aspect of the present disclosure, if the scheduling constraint information of a beam indicates that the beam has a scheduling constraint, the beam is scheduled on constrained radio resources thereby coordinating with at least one interfering beam. According to one or more embodiments of the sixth aspect of the present disclosure, it may be determined that the terminal device is switched to a new serving beam, if the new serving beam satisfies a predefined criterion that the new serving beam has a largest signal quality measurement among the beams having no scheduling constraint. According to one or more alternative or additional embodiments, it may be determined that the terminal device is switched to multiple serving beams at least partially based on a predefined criterion that the multiple serving beams are scheduled on their constrained radio resources that are orthogonal with one another.

According to the seventh aspect of the present disclosure, there is provided a terminal device. In an embodiment of the seventh aspect of the present disclosure, the terminal device comprises processing means which is adapted to cause to obtain signal quality measurements of plural beams; and cause to select at least one serving beam from the plural beams depending upon the obtained signal quality measurements and scheduling constraint information of the plural beams. According to one or more embodiments of the seventh aspect of the present disclosure, the processing means may comprise a processor and a memory and the memory may contain instructions executable by the processor.

According to the eighth aspect of the present disclosure, there is provided a radio access node device. In an embodiment of the eighth aspect of the present disclosure, the radio access node device comprises processing means which is adapted to cause to send to a terminal device a configuration signaling indicating scheduling constraint information of plural beams transmitted by the radio access node device; and cause to communicate with the terminal device over a serving beam selected by the terminal device from the plural beams. According to one or more embodiments of the seventh aspect of the present disclosure, the processing means may comprise a processor and a memory and the memory may contain instructions executable by the processor.

According to the ninth aspect of the present disclosure, there is provided a radio access node device. In an embodiment of the ninth aspect of the present disclosure, the radio access node device comprises processing means which is adapted to cause to receive from a terminal device a report message indicating signal quality measurements of plural beams received by the terminal device; cause to determine whether or not to switch the terminal device from at least one current serving beam to at least one new serving beam, depending upon scheduling constraint information of the plural beams and the signal quality measurements reported by the terminal device; and cause to inform the terminal device of the at least one new serving beam, in response to determining that the terminal device is switched to the at least one new serving beam. According to one or more embodiments of the seventh aspect of the present disclosure, the processing means may comprise a processor and a memory and the memory may contain instructions executable by the processor.

According to the various aspects and embodiments as mentioned above, the scheduling constrains applied on the beams/links can be taken into consideration when selecting or reselecting a serving beam for a terminal device, which may allow an mmW network operating link-specific coordination to control the probability that a terminal device is served by a coordinated beam on constrained radio resources at a lower level as possible.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of Long Term Evolution (LTE) or LTE Advanced (LTE-A) type wireless communication system for illustrative purposes, those skilled in the art will recognize that one or more embodiments of the present disclosure can also be applied to various other types of wireless communication systems. Thus, the following aspects, features, embodiments and advantages are only for illustrative purposes, and should not be understood as elements or limitations of the appended claims, unless otherwise explicitly specified in the claims.

Figure 1:
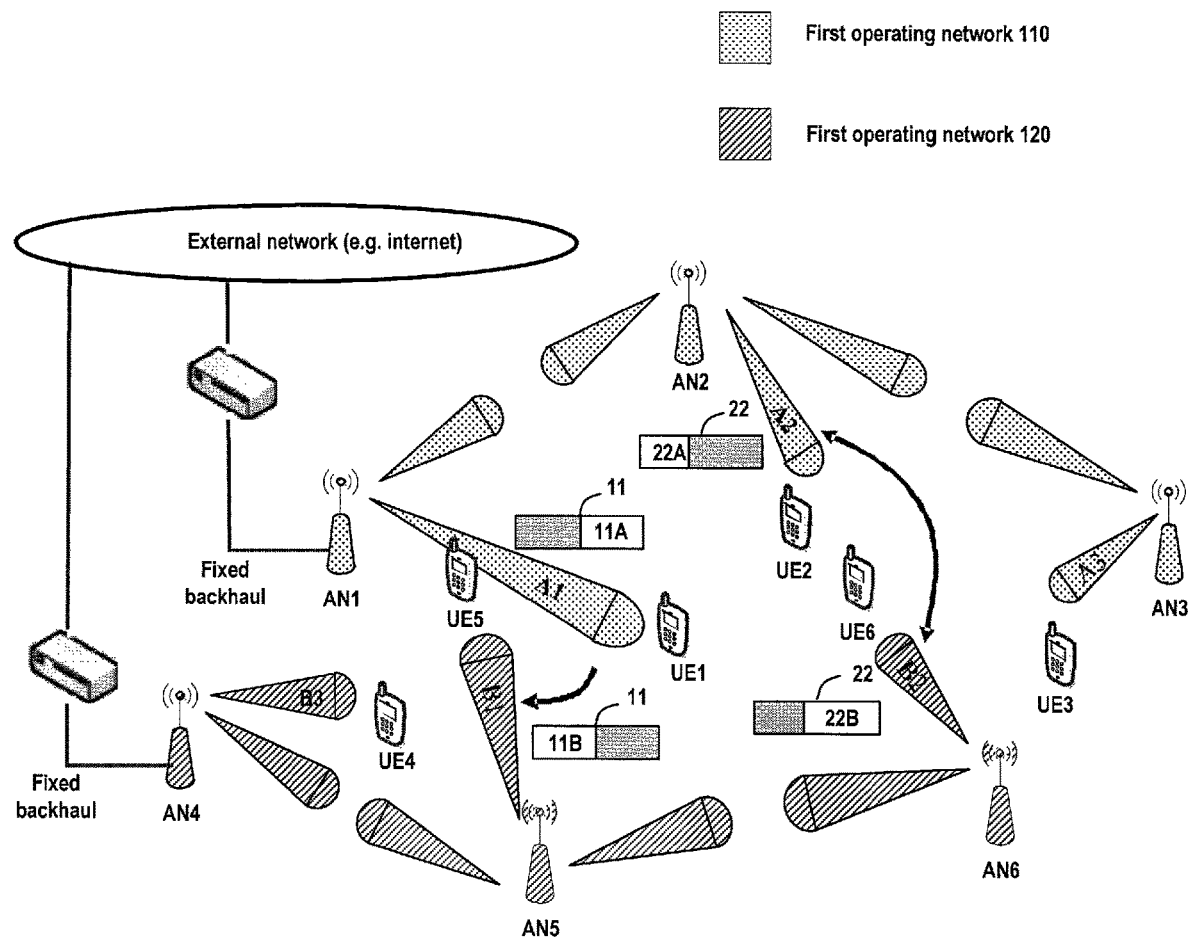
FIG. 1 is a schematic overview diagram depicting a scenario for link-specific coordination.

FIG. 1 is a schematic overview diagram depicting a scenario for link-specific coordination.

As illustrated by FIG. 1, two operating networks, for example two mmW networks, share a radio spectrum, wherein a first operating network 110 shown with a dotted pattern comprises three radio access nodes AN1-AN3 which serve user equipment UE1-UE3, respectively and a second operating network 120 shown with a striped pattern also comprises three radio access nodes AN4-AN6 which serve UE4-UE6. The two operating networks 110, 120 are located in a same area and operate on a same channel. Hence they may cause interference to each other. The interference between links in different networks may be bidirectional or uni-directional. For example, link A1 between AN1 and UE1 in the first operating network 110 may cause interference to link B1 between AN4 and UE5 in the second operating network 120, which is illustrated with a single head arrow; and link A2 between AN2 and UE2 in the first operating network 110 may cause interference to link B2 between AN6 and UE6 in the second operating network 120 and vice versa, which is illustrated with a double head arrow.

Such interference may be handled by using link-specific coordination schemes, which allows coordinating radio resources usage on a link basis. It should be appreciated that in the context of mmW networks, the term "link" may also be referred to as "beam", which technically means a radio beam used to set up a corresponding transmission link between a AN and a UE. In the context of link-specific coordination, the beams belonging to a coordination group are scheduled only on constrained radio resources such that interfering transmissions on different beams within the coordination group do not or at least less probably end up on the same radio resources. Some link-specific coordination context-based solutions are disclosed in PCT application NO. PCT/CN2014/070999, PCT/CN2014/070997 and PCT/CN2014/084640, which may achieve the inter-network resource coordination between different mmW networks sharing a spectrum and are entirely incorporated herein by way of reference.

For the purpose of simplicity and conciseness, there is provided a simple example of link-specific coordination schemes with reference to the scenario of FIG. 1. For the coordination link pair of links A1 and B1, scheduling constraints may be applied on each of them. For example, according to the scheduling constraints applied to links A1 and B1, link A1 is only allowed to operate on a first part 11A of available radio resources 11, while link B1 is only allowed to operate on a second part 11B of the same radio resources 11. In some implementations, the first part 11A and the second part 11B of the available radio resources 11 may be orthogonal with each other so that the inference between link A1 and link B1 can be completely eliminated. However, in some other implementations, it may be also allowed to have the first half 11A and the second part 11B partially overlapped with each other (not shown in FIG. 1), i.e., scheduling link A1 on the constrained radio resources non-orthogonal (i.e., partially orthogonal) to link B1 on radio resources. In that way, a tradeoff between interference cancellation and efficient resource utilization may be gained. Similarly, in the example of FIG. 1, scheduling constraints may be also applied to coordination link pair of link A2 and link B2, which allows that link A2 operates on a part 22A and link B2 on a part 22B of the radio resources 22. In this example, according to the scheduling constraints, link B2 may be scheduled to occupy more radio resources than link A2 (i.e., the part of 22B is larger than 22A), for example, because the communications between AN6 and UE6 on link B2 may have a higher priority than those between AN2 and UE2.

Although some examples of scheduling constraints of the link-specific coordination schemes are described herein with reference to FIG. 1, those skilled in the art may appreciate that scheduling constraints applied to the coordination group of beams may become more complicated, especially for the scenarios where there are more than two beams in a coordination group scheduled on the same available radio resources.

In order to evaluate the radio resource usage efficiency of the link-specific coordination, a performance metric "transmission opportunity" may be introduced, which represents the ratio of actually allocated radio resources with respect to the total available resources. Theoretically, only fractional transmission opportunity is provided for the beams having a scheduling constraint in the link-specific coordination, because it has to share the total available radio resources with the other beams in the coordination group for interference avoidance. For example, in the example of FIG. 1, UE1 is served by AN1 of the first operating network 110 via link A1. After interference coordination, the scheduling constraint is applied to link A1 in a way that only the part 11A of the available radio resources 11 is allowed to be scheduled. In other words, the rest of the total available radio resources other than the part 11A will be wasted with respect to AN1. In contrast, if AN1 reuses the total available radio resources, then although the inter-network interference is unavoidable, AN1 will gain 100% transmission opportunity. Loss of transmission opportunity may lead to throughput loss from both system and UE perspectives.

In order to solve or at least mitigate the potential problem of throughput loss resulted from the link-specific coordination of scheduling links/beams on constrained radio resources, various embodiments of the present disclosure as described herein aim to provide one or more solutions for beam selection or reselection, thereby controlling the probability that a terminal device is served by a coordinated beam having a scheduling constraint at a lower level as possible.

In the present disclosure, terminal devices also known as mobile terminals, wireless terminals and/or User Equipment (UE) are enabled to communicate wirelessly with a radio access node in an operating network, sometimes also referred to as an mmW system. For instance, a terminal device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The terminal device may be a portable, pocket-storable, hand-held, computer-comprised, or vehicle-mounted mobile device, enabled to communicate voice and/or data, via at least one serving beam, with its serving radio access node(s).

Typically, a radio access node device may serve one or more terminal devices via one or several beams. The radio access node device in some wireless communication systems may be also referred to as "eNB", "eNodeB", "NodeB" or "B node", depending on the technology and terminology used. In the present disclosure, the radio access network node device may also be referred to as an access node (AN).

With reference to FIGS. 2-8, various embodiments of the present disclosure are described in detail.

Figure 2:
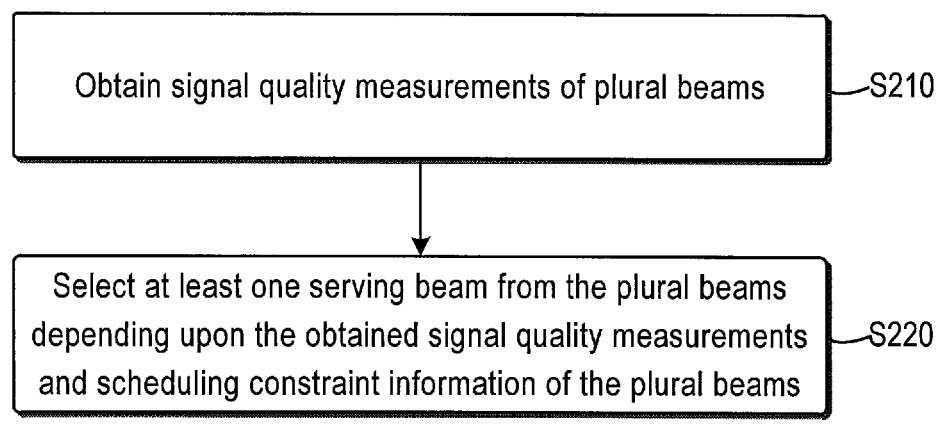
FIG. 2 is a diagram schematically illustrating an exemplary flow chart of a method for use in a terminal device for terminal-triggered beam selection according to one or more embodiments of the present disclosure.

FIG. 2 is a diagram schematically illustrating an exemplary flow chart of a method 200 for use in a terminal device for terminal-triggered beam selection according to one or more embodiments of the present disclosure.

As shown in FIG. 2, in step S210, a terminal device, for example, UE 2 as illustrated in FIG. 1 which may in an idle mode, obtains signal quality measurements of plural beams. The signal quality measurements may be any kind of suitable parameters reflecting signal quality of the beams that can be detected by the terminal device. In some implementations, the signal quality measurements may include signal strength of beams. The terminal device may directly measure the signal strength of the received plural beams. In some alternative and/or additional implementations, the signal quality measurements may include Signal to Interference plus Noise Ratio (SINR) which may be measured or evaluated with respect to a reference signal of a relevant beam.

In step S220, the terminal device selects at least one serving beam from the plural beams depending upon the obtained signal quality measurements and scheduling constraint information of the plural beams. If the scheduling constraint information of a beam indicates that the beam has a scheduling constraint, then it means that the beam is currently scheduled on constrained radio resources and coordinated with at least one interfering beam. In other word, the beam under a scheduling constraint is only allowed to be scheduled at a part of the total radio resources so as to eliminate or at least mitigate the interference with coordinated beam(s) scheduled on different part(s) of the total radio resources. According to one or more embodiments of the present disclosure, the constrained radio resources schedulable to a beam having the scheduling constraint may be at least partially orthogonal to radio resources schedulable to the at least one interfering beam. The constrained radio resources may be in at least one of a time domain, a frequency domain, and a code domain.

Each radio access node device may have the knowledge of the scheduling constraint information for all the beams it transmits. According to one or more embodiments, the terminal device may receive a configuration signaling transmitted from a corresponding radio access node device, wherein the configuration signaling indicates the scheduling constraint information of the beams.

In some implementations, the radio access node device may send the configuration signaling to the terminal device in either the beam-specific or cell-specific system information. For example, the information elements of the configuration signaling may include:

Scheduling constraint indicator for each beam: this could be a bitmap of the beam ID and the scheduling constraint indicator to tell the terminal device whether the beam has scheduling constraint or not;

Signal strength threshold for beam selection/reselection: the terminal device may measure the plural beams in the initial beam selection procedure. Optionally and preferably, the terminal device may choose the measured beams which have received signal strength larger than the signal strength threshold as the candidate beams so as to further perform the serving beam selection.

Traditionally, the terminal device would select the beam providing the optimal signal quality. However, in the context of the link-specific coordination, the beam providing the best signal quality may not be the best choice as the serving beam, since this beam may have been applied a scheduling constraint. The reason is that this "best-signal-quality" beam may only provide a limited transmission opportunity due to scheduling on the restricted radio resources. According to various embodiments of the present disclosure, the terminal device considers not only the signal quality of the beam but also whether there is a scheduling constraint applied in the beam when selecting the serving beam(s) from the plural beams.

In an alternative embodiment of the present disclosure, in step S220, the terminal device may select a serving beam from the plural beams at least partially based on a predefined criterion that the serving beam has a largest quality measurement among the beams having no scheduling constraint. According to the embodiment, the terminal device may avoid selecting a beam having a scheduling constraint even that beam may provide a highest signal quality among the plural received beams. Instead, the terminal device may be configured to select only from those beams without any scheduling constraints a serving beam which has a largest signal quality measurement among those beams having no scheduling constraints. In this way, a beam without any scheduling constraint may be prioritized as a serving beam.

By means of the method 200 as described above, the terminal device can take the negative impacts of beams' scheduling constraints on the transmission opportunity into account when selecting one or more serving beams. In that way, an appropriate criterion for selecting the serving beam(s) may be predefined such that the possibility of a terminal device is served by a coordinated beam on constrained radio resources may be controlled at a lower level as possible.

Figure 3:
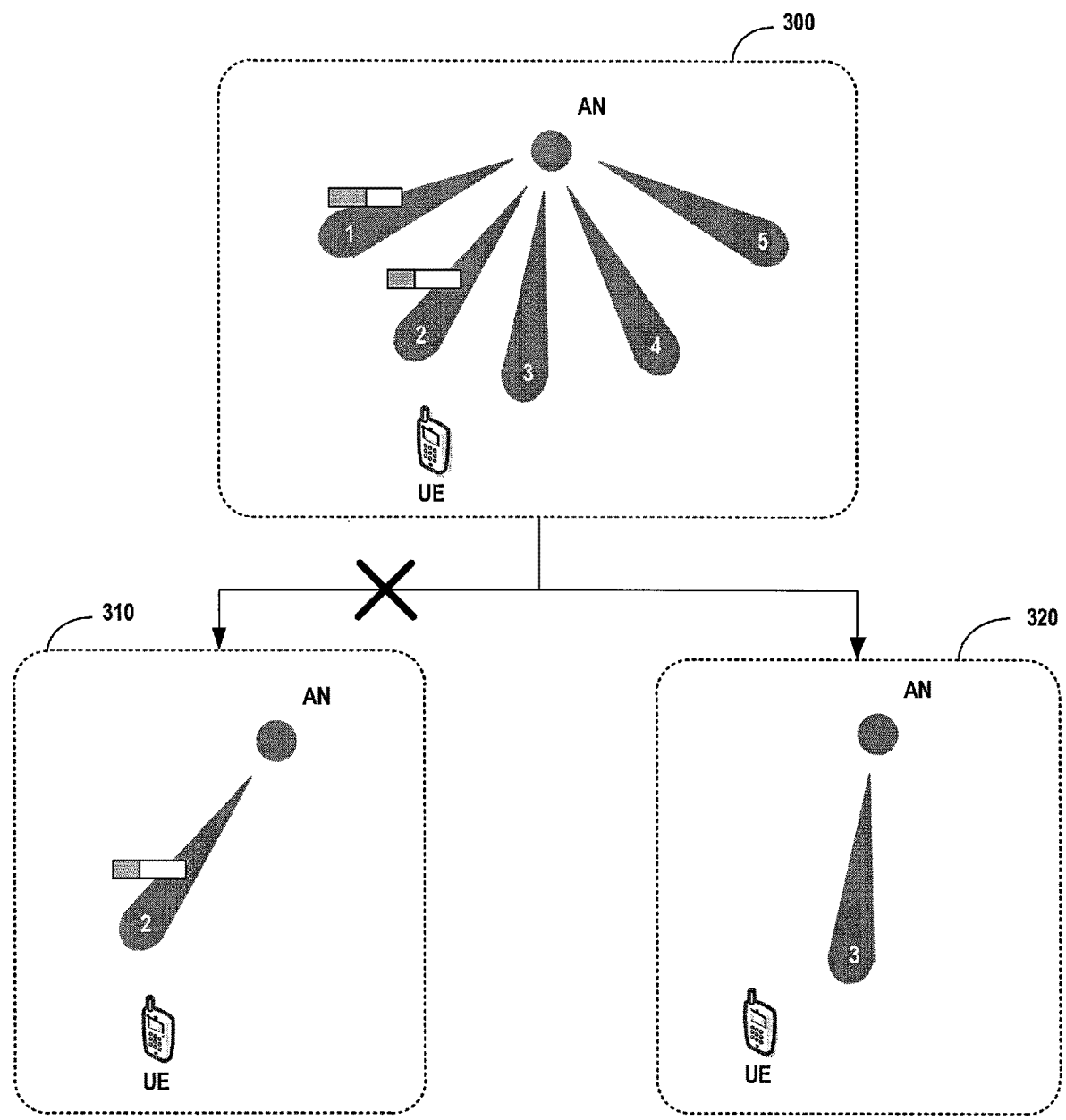
FIG. 3 is a diagram schematically illustrating an example implementation of selecting a serving beam according to one or more embodiments of the present disclosure.

FIG. 3 is a diagram schematically illustrating an example implementation of selecting a serving beam according to one or more embodiments of the present disclosure.

In this implementation, a UE may measure Beams 1-5 of a radio access node device AN, as shown in block 300. Table 1 shows the signal quality measurements of Beams 1-5 obtained by the UE, which in this implementation is represented by signal strength. Table 1 further shows the scheduling constraint information of Beams 1-5, wherein the value "1" of the scheduling constraint information indicates that the corresponding beam has a scheduling constraint, while the value "0" indicate that the corresponding beam has no scheduling constraint.

The UE may receive the configuration signaling from the AN so as to obtain the scheduling constraint information of Beams 1-5. Additionally, the configuration signaling may also include the signal strength threshold −30 dBm, indicating that beams which have signal strength higher than −30 dBm can be determined as candidate beams for beam selection. As such, Beam 5 which only has −40 dBm signal strength lower than the signal quality threshold will exclude from being a candidate beam for selection.

TABLE 1

|  | Beam 1 | Beam 2 | Beam 3 | Beam 4 | Beam 5 |
| --- | --- | --- | --- | --- | --- |
| Signal Strength | −26 dBm | −18 dBm | −20 dBm | −25 dBm | −40 dBm |
| Scheduling Constraint Information | 1 | 1 | 0 | 0 | 0 |

Block 310 shows a result of the traditional beam selection based only on received signal strength. The UE would select Beam 2 as the serving beam, since Beam 2 has the strongest received signal strength −18 dBm. However, it can be seen from Table 1, since the scheduling information shows that Beam 2 has a scheduling constraint and has to be scheduled on constrained radio resources, the UE may lose transmission opportunity under the link-specific coordination if selecting Beam 2 as its serving beam.

Block 320 shows a result of the beam selection according to the embodiment of the present disclosure as described herein. Since Beam 3 has the largest signal strength −20 dBm in those beams with the value "0" of the scheduling constraint information, the UE selects Beam 3 as its serving beam based on the predefined criterion, i.e., the serving beam should have a largest quality measurement among the beams having no scheduling constraint.

Although an example predefined criterion for selecting the serving beam is described in details with reference to FIG. 3, a person skilled in the art should appreciate that when taking into scheduling constraints of beams into consideration, some other predefined criterion or criteria may also suitable and applicable to the beam selection procedure, which still fall within the scope of the present disclosure. For instance in some embodiments, a beam having a scheduling constraint may be further assigned with a constraint weight, which represents a constraint level applied to by the beam in the link-specific coordination. For example, a constraint weight may be specified such that the less radio resources the beam can be scheduled on, the higher the value of the constraint weight. Such constraint weights of beams may also be informed from the radio access node to the terminal device together with or as a portion of the scheduling constraint information, to facilitate the beam selection at the terminal side. If all candidate beams have scheduling constraints, the terminal device may tend to select a beam which is scheduled to use the highest proportion of the total radio resources (i.e., the beam having a lowest constraint weight) among others. Alternatively or additionally, the terminal device may calculate a utility function for each candidate beam depending upon the signal quality measurement (e.g., signal strength, SINR or both), the scheduling constraint information and the assigned constraint weight of the candidate beam and any other elements which may affect the beam selection. The terminal device may, for example, select an appropriate beam, for example, having the highest value of the utility function (depending upon how to define the utility function) so as to gain an advantageous tradeoff between interference cancellation and efficient resource utilization.

By way of example, the utility function $U_i$ for Beam i may be expressed as $$U_i = f(SINR, P_r, C), \qquad 1)$$

where SINR is the SINR of Beam i measured by the terminal device, $P_r$ is the received signal strength of Beam i and C is the scheduling constraints. One example of a utility function is defined as follows:

$$U_i = \frac{a \cdot SINR + b \cdot P_r}{C} \qquad 2)$$

where a and b is a positive constant. According to the definition of equation 2), it is noted that the beam with higher SINR and $P_r$, while with lower scheduling constraints, the more chances the beam is selected as the new serving beam.

Figure 4:
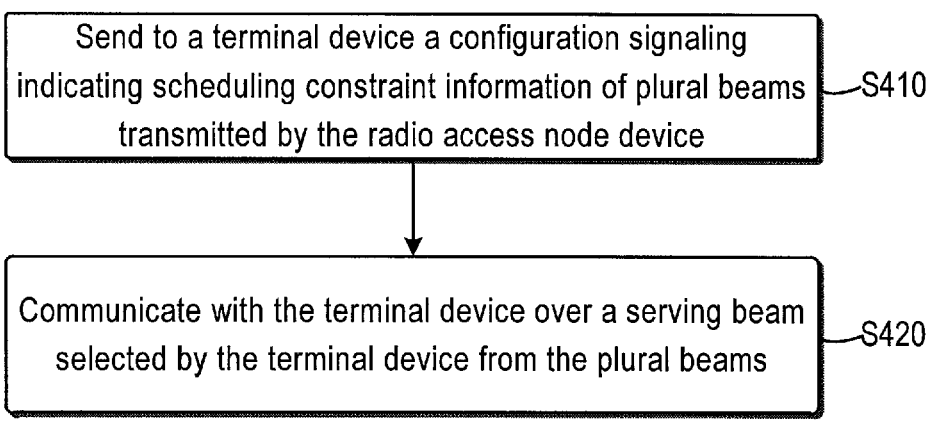
FIG. 4 is a diagram schematically illustrating an exemplary flow chart of a method for use in a radio access node device for terminal-triggered beam selection according to one or more embodiments of the present disclosure.

FIG. 4 is a diagram schematically illustrating an exemplary flow chart of a method 400 for use in a radio access node device for terminal-triggered beam selection according to one or more embodiments of the present disclosure.

As shown in FIG. 4, in step S410, the radio access node device, for example AN2 as illustrated in FIG. 1, sends to a terminal device, for example UE2 as illustrated in FIG. 1, a configuration signaling indicating scheduling constraint information of plural beams transmitted by the radio access node device. In some implementations, the radio access node device may send the configuration signaling to the terminal device in either the beam-specific or cell-specific system information. For example, the information elements of the configuration signaling may include:

Scheduling constraint indicator for each beam: this could be a bitmap of the beam ID and the scheduling constraint indicator to tell the terminal device whether the beam has scheduling constraint or not;

Signal quality threshold for beam selection/reselection: the terminal device may measure the plural beams in the initial beam selection procedure. Optionally and preferably, the terminal device may choose the measured beams which have received signal quality measurements larger than the signal quality threshold as the candidate beams so as to further perform the serving beam selection.

In the step S420, the radio access node device can communicate with the terminal device over a serving beam selected by the terminal device from the plural beams. The serving beam may be selected by the terminal device depending upon signal quality measurement and scheduling constraint information of the plural beams. According to one or more embodiments of the present disclosure, the constrained radio resources schedulable to a beam having the scheduling constraint may be at least partially orthogonal to radio resources schedulable to the at least one interfering beam. The constrained radio resources may be in at least one of a time domain, a frequency domain, and a code domain.

According to the embodiments as described with reference to FIGS. 2, 3 and 4, during the terminal-triggered beam selection procedure, the scheduling constrains applied on the beams/links can be taken into consideration by the terminal device. Those skilled in the art may appropriately define the criterion of selecting a serving beam, such that the probability that a terminal device is served by a coordinated beam on constrained radio resources which may allow an mmW network operating link-specific coordination can be controlled at a lower level as possible.

Figure 5:
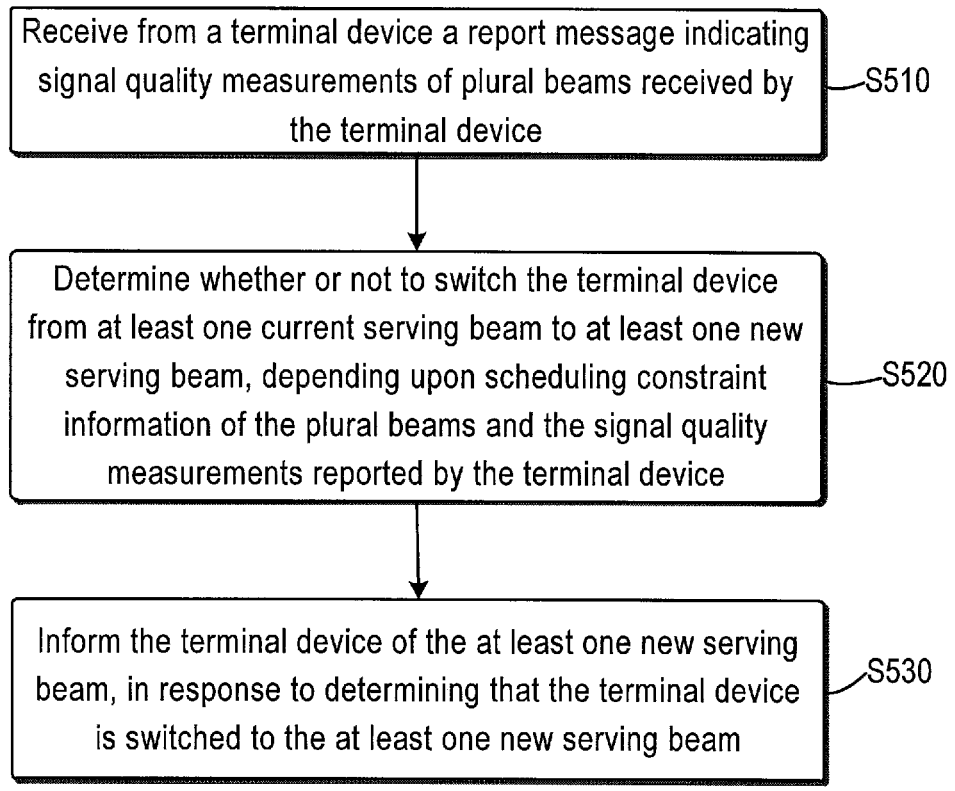
FIG. 5 is a diagram schematically illustrating an exemplary flow chart of a method for use in a radio access node device for network-triggered beam selection according to one or more embodiments of the present disclosure.

When a terminal device is in the connectivity mode which means the terminal device is receiving/transmitting data from/to the radio access node device, it is possible that the terminal device needs to be switched from the currently serving beam(s) to new serving beam(s) in some situations, i.e., re-selecting one or more appropriate serving beams. Normally such a beam switching or reselecting procedure may be triggered and controlled by the radio access node device. FIG. 5 is a diagram schematically illustrating an exemplary flow chart of a method 500 for use in a radio access node device for network-triggered beam selection according to one or more embodiments of the present disclosure.

As shown in FIG. 5, in step S510, the radio access node device, for example, the AN1 as shown in FIG. 1, receives from a terminal device a report message indicating signal quality measurements of plural beams received by the terminal device. The signal quality measurements contained in the report message may be any kind of suitable parameters reflecting signal quality of the beams that can be detected or measured by the terminal device. In some implementations, the signal quality measurements may include signal strength of beams. The terminal device may directly measure the signal strength of the received plural beams. In some alternative and/or additional implementations, the signal quality measurements may include SINR which may be measured or evaluated with respect to a reference signal of a relevant beam.

According to some implementations, the radio access node device may control the signal measurement procedure of the terminal device by sending relevant configuration signaling via terminal-specific way. The information elements of the configuration signaling may include:

Measurement trigger: this parameter is to inform the terminal device when the measurement procedure should start. The measurement trigger would be a period-based trigger or event-based trigger. For example, the measurement trigger may be set as a time period, i.e., 5 ms, which indicates that the terminal device will perform signal quality measurement every 5 ms and report the measurement results to the radio access node device. In another example, if the measurement trigger is an event-based trigger, it could be some performance metrics, for example, the throughput in a period or the received SINR. The measurement procedure will be triggered once the performance metric is decreased by some degree.

Signal quality threshold: the terminal device will measure multiple beams but only those beams which have larger received signal quality measurements than the signal quality threshold will be selected to report the quality threshold measurements.

Based on the configuration signaling received from the radio access node device, the terminal device may perform signal quality measurement procedure according to the measurement trigger. The terminal device may only report those beams which meet the requirement of the signal quality threshold to the radio access node device. For example, if the signal quality threshold is a signal strength threshold, the terminal device will select the beams which have larger received signal strength than this signal strength threshold and report the selected beams to the radio access node device, for example, by informing of corresponding beam IDs.

In step S520, it is determined by the radio access node device whether or not to switch the terminal device from at least one current serving beam to at least one new serving beam, depending upon scheduling constraint information of the plural beams and the signal quality measurements reported by the terminal device. If the scheduling constraint information of a beam indicates that the beam has a scheduling constraint, the beam is scheduled on constrained radio resources thereby coordinating with at least one interfering beam. According to some embodiments of the present disclosure, the constrained radio resources schedulable to the beam having the scheduling constraint may be at least partially orthogonal to radio resources schedulable to the at least one interfering beam. The constrained radio resources may include in time domain resources, frequency domain resources, code domain resources and any suitable combinations thereof.

According to one or more embodiments of the present disclosure, the radio access node device may determine not to switch the terminal device but keeping it in the currently serving beam(s), if there is not enough good candidate beams reported from the terminal device since the candidate beams are all in the bad channel quality. The radio access node device may also determine not to switch the terminal device, if the current serving beam is in the good channel quality and has an acceptable scheduling constraint or no scheduling constraint.

According to one or more embodiments of the present disclosure, the determining step of S520 may include determining that the terminal device is switched to a new serving beam, if the new serving beam satisfies a predefined criterion that the new serving beam has a largest signal quality measurement among the beams having no scheduling constraint. Advantageously and additionally, the signal quality measurement of the new serving beam is better to be higher than that of the current serving beam.

Similar to the embodiments where the terminal device triggers the beam selection procedure, when taking into scheduling constraints of beams into consideration, those skilled in the art may realize that some other predefined criterion or criteria may also suitable and applicable to the beam re-selection procedure according to the embodiments of the present disclosure. For instance, in some embodiments, a beam having a scheduling constraint may be further assigned with a constraint weight, which represents a constraint level applied to by the beam in the link-specific coordination. For example, the constraint weights may be specified such that the less radio resources the beam can be scheduled on, the higher the value of constraint weight. If all reported beams have scheduling constraints, the radio access node device may tend to select a beam which is scheduled to use the highest proportion of the total radio resources (i.e., having a lowest constraint weight) among others. Alternatively or additionally, the radio access node device may calculate a utility function for each reported beam depending upon the signal quality measurement (e.g., signal strength, SINR or both), the scheduling constraint information and the assigned constraint weight of the reported beam and any other elements which may affect the beam selection. The radio access node device may select an appropriate beam, for example, having the maximum value of the utility function (depending upon how to define the utility function) so as to gain an advantageous tradeoff between interference cancellation and efficient resource utilization.

In one example, the utility function $U_i$ for Beam i may be expressed as $$U_i = f(SINR, P_r, C), \quad 1)$$

where SINR is the SINR of Beam i measured by the terminal device, $P_r$ is the received signal strength of Beam i and C is the scheduling constraints. One example of a utility function is defined as follows:

$$U_i = \frac{a \cdot SINR + b \cdot P_r}{C} \quad 2)$$

where a and b is a positive constant. According to the definition of equation 2), it is noted that the beam with higher SINR and $P_r$ while with lower scheduling constraints, the more chances the beam is selected as the new serving beam.

According to one or more embodiments of the present disclosure, the determining step of S520 may include determining that the terminal device is switched to multiple serving beams at least partially based on a predefined criterion that the multiple serving beams are scheduled on their constrained radio resources that are orthogonal with one another. This means the terminal device's data transmission can be served by the multiple beams with orthogonal scheduling constraints. In this way, the terminal device may utilize more radio resources on the multiple serving beams so that the loss of transmission opportunity can be alleviated.

Figure 6:
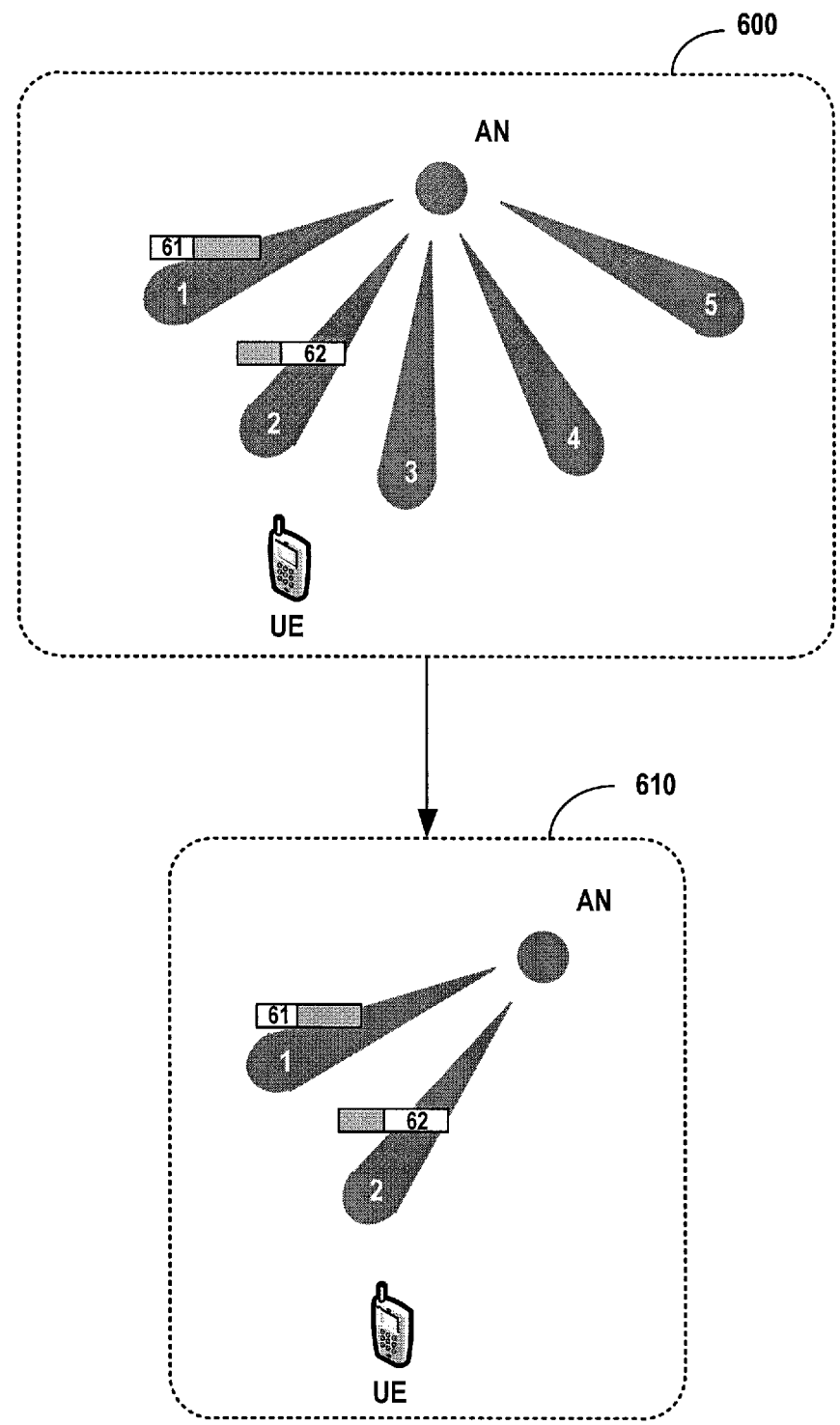
FIG. 6 is a diagram schematically illustrating an example implementation of re-selecting multiple serving beams for a terminal device according to one or more embodiments of the present disclosure.

FIG. 6 is a diagram schematically illustrating an example implementation of re-selecting multiple serving beams for a terminal device according to one or more embodiments of the present disclosure. As shown in block 600, the radio access node device AN receives from a terminal device UE a report message indicating signal quality measurements of Beams 1-5 received by the terminal device. In some circumstance, for example, when Beam 1 and Beam 2 have substantially the same signal quality as reported from the UE, the AN may decide to switch the UE to be connected with both Beam 1 and Beam 2, since the scheduling constraints for Beams 1 and 2 are orthogonal with each other for example in time domain. The UE will connect to Beam 1 in time slots 61 and connect to beam 2 in time slots 62. In this way, the UE can be scheduled in the whole time domain resources, i.e., time slots 61 plus time slots 62.

In step S530, the radio access node device informs the terminal device of the at least one new serving beam, in response to determining that the terminal device is switched to the at least one new serving beam.

According to one or more embodiments of the present disclosure, if the radio access node device decides to establish a multi-beam connectivity for the terminal device, the radio access node device may also notify the terminal the radio resource allocation information on how to communicating data via different beams. For example, in the example as shown in FIG. 6, the radio access node device AN may inform the terminal device UE that it should connect to Beam 1 in time slots 61 and connect to beam 2 in time slots 62.

When the terminal device receives the beam switching configuration from the radio access node device, the terminal device will change its beam direction(s) to the corresponding beam(s). According to the embodiments of multi-beam connectivity, the terminal device may also switch to the decided serving beams in accordance with the radio resource allocation information notified by the radio access node device.

According to the embodiments as described with reference to FIGS. 5 and 6, during the network-triggered beam re-selection procedure, the scheduling constraints applied on the beams/links can be taken into consideration by the radio access node device so as to determine whether to switch the terminal device from current serving beam(s) to new serving beam(s). Those skilled in the art may appropriately define the criterion of selecting one or more serving beam, such that the probability that a terminal device is served by a coordinated beam on constrained radio resources can be controlled at a lower level as possible.

Figure 7:
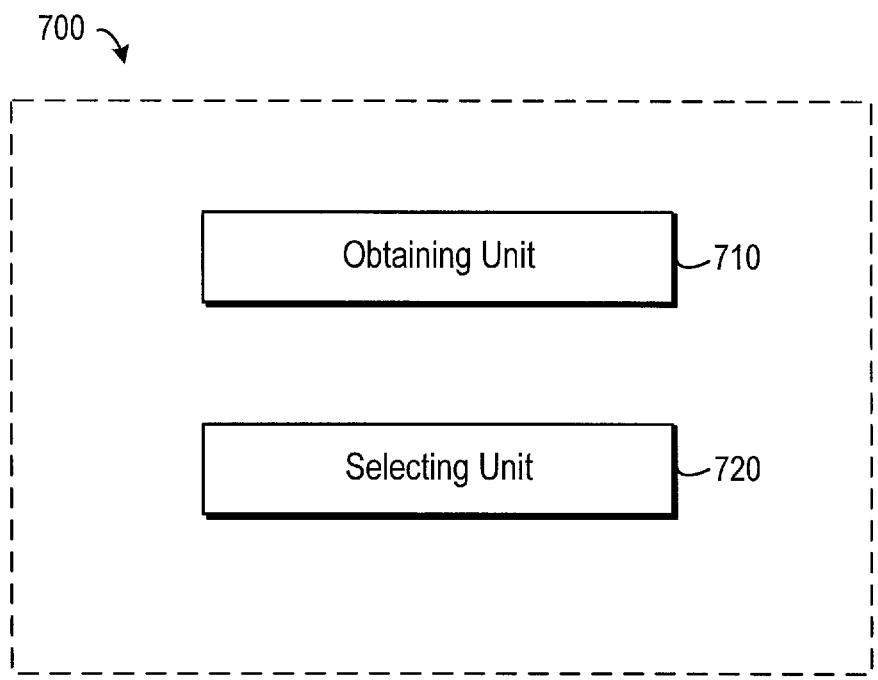
FIG. 7 is a block diagram schematically illustrating a terminal device according to one or more embodiments of the present disclosure.

FIG. 7 is a block diagram schematically illustrating a terminal device 700 according to one or more embodiments of the present disclosure.

As shown in FIG. 7, the terminal device 700, such as the UE 1, UE2 as shown in FIG. 1, can be communicatively connected with a radio access node device in an mmW network. When an idle mode, the terminal device 700 may trigger a beam selection procedure according to an embodiment of the present disclosure.

The terminal device 700 comprises an obtaining unit 710 and a selecting unit 720. The obtaining unit 710 is configured to obtain signal quality measurements of plural beams. The signal quality measurements may include signal strength, SINR and any suitable parameters representing signal quality of a beam. The selecting unit 720 is configured to select at least one serving beam from the plural beams depending upon the obtained signal quality measurements and scheduling constraint information of the plural beams. According to one embodiment of the present disclosure, the selecting unit 720 may be configured to select a serving beam from the plural beams at least partially based on a predefined criterion that the serving beam has largest signal quality measurement among the beams having no scheduling constraint.

According to one or more embodiments of the present disclosure, if the scheduling constraint information of a beam indicates that the beam has a scheduling constraint, the beam is scheduled on constrained radio resources thereby coordinating with at least one interfering beam. In one or more embodiments of the present disclosure, the constrained radio resources schedulable to the beam having the scheduling constraint are at least partially orthogonal to radio resources schedulable to the at least one interfering beam.

According to one or more embodiments of the present disclosure, the terminal device may comprises a receiving unit configured to receive a configuration signaling transmitted from a radio access node device, wherein the configuration signaling indicates the scheduling constraint information of the beams.

It should be appreciated by a person skilled in the art that the selecting unit 720 may adopt any other suitable predefined criterion or criteria in selecting a serving beam depending upon the signal quality measurements and the scheduling constraints. Some detailed examples of the alternative and/or additional predefined criterion or criteria have been set forth above with reference to FIGS. 2 and 3 and therefore details thereof are omitted herein for a purpose of conciseness.

Figure 8:
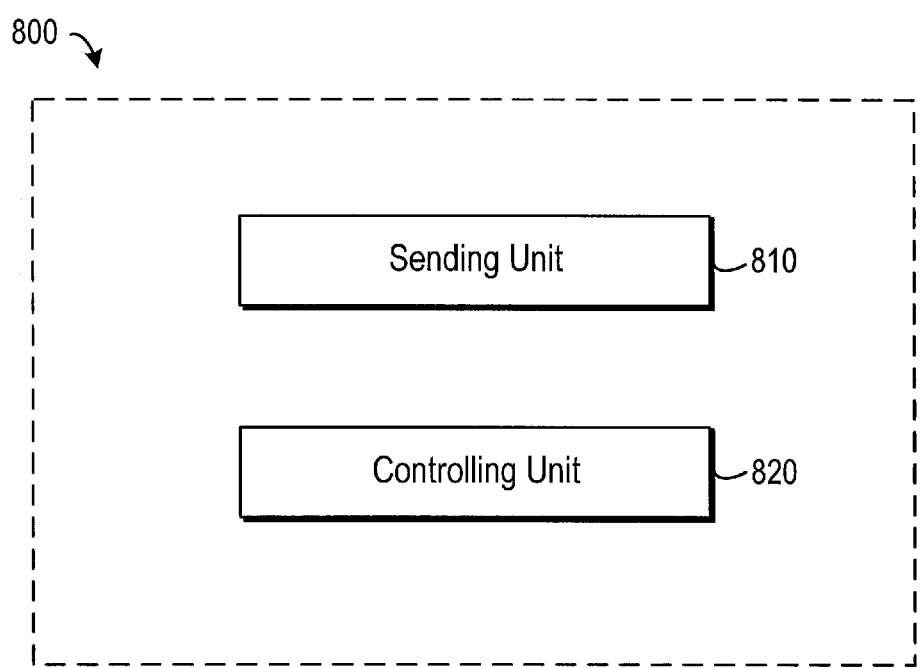
FIG. 8 is a block diagram schematically illustrating a radio access node device according to one or more embodiments of the present disclosure.

FIG. 8 is a block diagram schematically illustrating a radio access node device 800 according to one or more embodiments of the present disclosure.

As shown in FIG. 8, the radio access node device 800 such as AN 1, AN2 as shown in FIG. 1, operates in an mmW network and can be communicatively connected with one or more terminal devices over beams.

The radio access node device 800 comprises a sending unit 810 and a controlling unit 820. In a terminal-triggered beam selection procedure, the sending unit 810 is configured to send to a terminal device a configuration signaling indicating scheduling constraint information of plural beams transmitted by the radio access node device. The controlling unit 820 is configured to control the radio access node device 800 to communicate with the terminal device over a serving beam selected by the terminal device from the plural beams. According to the embodiments of the present disclosure, the serving beam may be selected from the plural beams by the terminal device depending upon signal quality measurements and scheduling constraint information of the plural beams.

In one or more embodiments of the present disclosure, if the scheduling constraint information of a beam indicates that the beam has a scheduling constraint, the beam is scheduled on constrained radio resources thereby coordinating with at least one interfering beam. The constrained radio resources schedulable to the beam having the scheduling constraint may be at least partially orthogonal to radio resources schedulable to the at least one interfering beam. The constrained radio resources may include but not limited to time domain resources, frequency domain resources, and code domain resources and/or any suitable combinations thereof.

Figure 9:
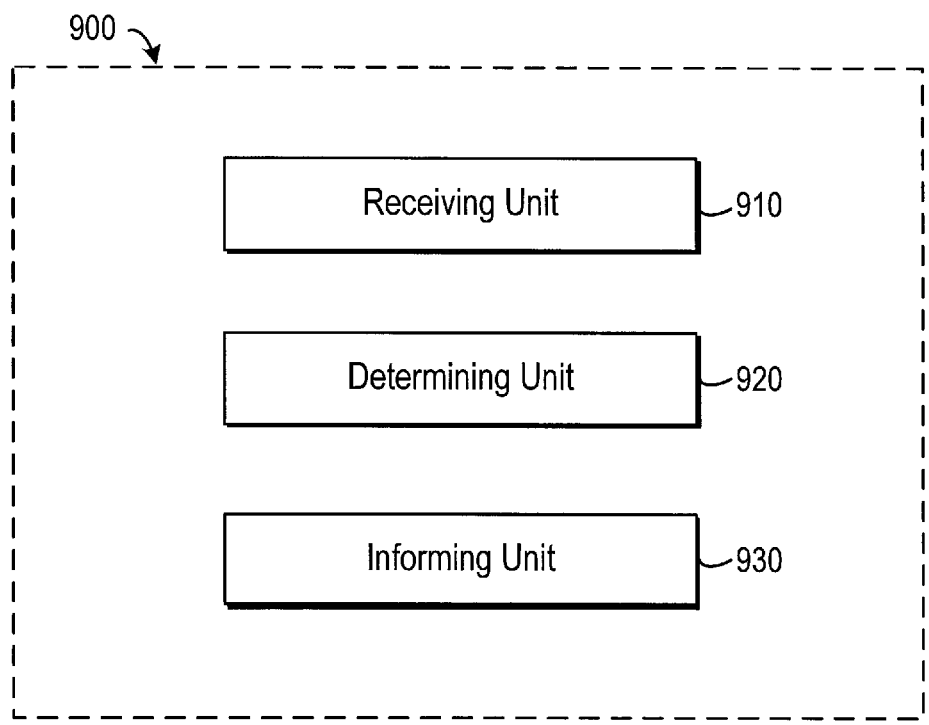
FIG. 9 is a block diagram schematically illustrating a radio access node device according to alternative or additional one or more embodiments of the present disclosure.

FIG. 9 is a block diagram schematically illustrating a radio access node device 900 according to other one or more embodiments of the present disclosure.

As shown in FIG. 9, the radio access node device 900 such as AN 1, AN2 as shown in FIG. 1, operates in an mmW network and can be communicatively connected with one or more terminal devices over beam(s).

The radio access node device 900 comprises a receiving unit 910, a determining unit 920 and an informing unit 930. In a network-triggered beam selection procedure, the receiving unit 910 is configured to receive from a terminal device a report message indicating signal quality measurements of plural beams received by the terminal device. The determining unit 920 is configured to determine whether or not to switch the terminal device from at least one current serving beam to at least one new serving beam, depending upon scheduling constraint information of the plural beams and the signal quality measurements reported by the terminal device. The signal quality measurements may include but not limited to the signal strength and/or SINR of candidate beams. The informing unit 930 is configured to inform the terminal device of the at least one new serving beam, in response to determining that the terminal device is switched to the at least one new serving beam.

According to one or more embodiments of the present disclosure, if the scheduling constraint information of a beam indicates that the beam has a scheduling constraint, the beam may be scheduled on constrained radio resources thereby coordinating with at least one interfering beam. The constrained radio resources schedulable to the beam having the scheduling constraint may be at least partially orthogonal to radio resources schedulable to the at least one interfering beam. The constrained radio resources may include but not limited to time domain resources, frequency domain resources, code domain resources and/or any suitable combinations thereof.

According to one or more embodiments of the present disclosure, the determining unit 920 may be configured to determine that the terminal device is switched to a new serving beam, if the new serving beam satisfies a predefined criterion that the new serving beam has a largest signal quality measurement among the beams having no scheduling constraint. Advantageously and additionally, the predefined criteria may include the signal quality measurement of the new serving beam is higher than that of the current serving beam.

According to other one or more embodiments of the present disclosure, the determining unit 920 may be configured to determine that the terminal device is switched to multiple serving beams at least partially based on a predefined criterion that the multiple serving beams are scheduled on their constrained radio resources that are orthogonal with one another.

It should be appreciated by a person skilled in the art that the determining unit 920 may adopt any other suitable predefined criterion or criteria in selecting a serving beam depending upon the signal quality measurements and the scheduling constraints. Some detailed examples of the alternative and/or additional predefined criterion or criteria have been set forth above with reference to FIGS. 5 and 6 and therefore details thereof are omitted herein for a purpose of conciseness.

It is to be understood that the apparatuses 700, 800 and 900 are capable of performing the methods 200, 400, and 500, respectively such that scheduling constraints of beams can be taken into consideration during a beam selection or re-selection procedure.

Figure 10:
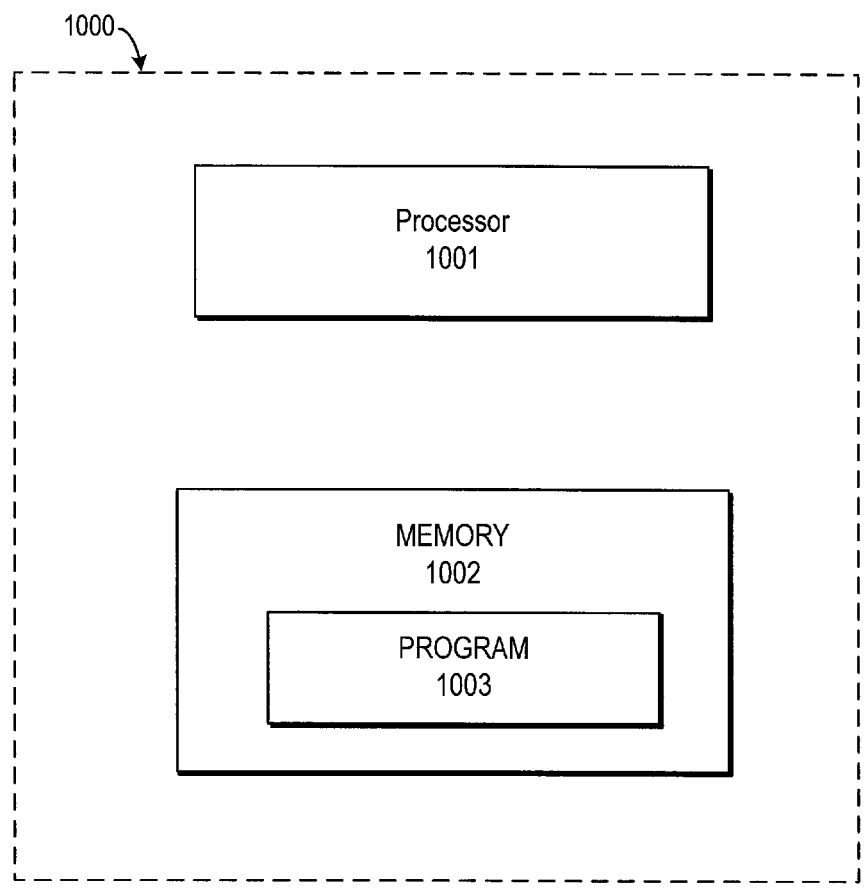
FIG. 10 is a schematic block diagram depicting an apparatus for coordinating resource scheduling according to embodiments of the present disclosure.

FIG. 10 is a schematic block diagram depicting an apparatus 1000 for coordinating resource scheduling according to embodiments of the present disclosure. As illustrated in FIG. 10, the apparatus 1000 includes at least one processor 1001, such as a data processor, at least one memory (MEM) 1002 coupled to the processor 1001. Depending on different implementations, although not shown, the apparatus 1000 may further include a suitable RF transmitter TX and receiver RX coupled to the processor 1001 so as to establish wireless connections with other nodes in the mmW network. The MEM 1002 stores a program (PROG) 1003. A combination of the processor 1001 and the memory 1002 forms processing means adapted to perform the embodiments of the present disclosure. The apparatus 1000 may be coupled via a data path to one or more external networks or systems, such as the internet, for example.

The PROG 1003 is assumed to include instructions that, when executed by the processor 1001, enable the apparatus 1000 to operate in accordance with the exemplary embodiments of the present disclosure, as discussed herein with the method 200 as described in detailed with reference to FIGS. 2 and 3, or the methods 400 and 500 as described in detail with reference to FIGS. 4, 5.

In general, the embodiments of the present disclosure may be implemented by computer software executable by at least one processor 1001 of the apparatus 1000, or by hardware, or by a combination of software and hardware.

The MEM 1002 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 1000, there may be several physically distinct memory units in the apparatus 1000. The processor 1001 may be of any type suitable to the local technical environment, and may include one or more of general purpose computers, special purpose computers, microprocessors, digital signal processors (DSPs) and processors based on multicore processor architecture, as non-limiting examples. The apparatus 1000 may have multiple processors, such as for example an application specific integrated circuit chip that is slaved in time to a clock which synchronizes the main processor.

According to the various aspects and embodiments as mentioned above, the scheduling constrains applied on the beams/links can be taken into consideration when selecting or reselecting a serving beam for a terminal device, which may allow to control the probability that a terminal device is served by a coordinated beam on constrained radio resources at a lower level as possible.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating a radio access node device, comprising:
    sending to a terminal device a configuration signaling indicating scheduling constraint information of plural beams transmitted by the radio access node device,
        wherein the scheduling constraint information indicates, via a scheduling constraint indicator, whether each beam of the plural beams has a scheduling constraint, wherein a first plurality of the plural beams are indicated to have a scheduling constraint and a second plurality of the plural beams are indicated to have no scheduling constraint, and
        wherein a beam under the scheduling constraint is only allowed to be scheduled at a part of total available radio resources in coordination with at least one interfering beam;
    selecting a serving beam from the plural beams by the terminal device based on the configuration signaling received; and
    communicating with the terminal device over the serving beam selected by the terminal device from the plural beams,
        wherein a predefined criterion on which the selecting the serving beam is partially based comprises the serving beam having a largest signal quality measurement among the beams having no scheduling constraint.

2. The method according to claim 1, wherein constrained radio resources schedulable to the beam having the scheduling constraint are at least partially orthogonal to radio resources schedulable to the at least one interfering beam.

3. A terminal device, comprising a processor and a memory in which contain instructions executable by the processor, causing the terminal device to:
    obtain signal quality measurements of plural beams;
    receive a configuration signalling transmitted from a radio access node device,
        wherein the configuration signaling indicates, via a scheduling constraint indicator, whether each beam of the plural beams has a scheduling constraint, wherein a first plurality of the plural beams are indicated to have a scheduling constraint and a second plurality of the plural beams are indicated to have no scheduling constraint, and
        wherein a beam under the scheduling constraint is only allowed to be scheduled at a part of total available radio resources in coordination with at least one interfering beam; and
    select at least one serving beam from the plural beams depending upon the obtained signal quality measurements and scheduling constraint information of the plural beams, wherein a predefined criterion on which the selecting a serving beam is partially based comprises the serving beam having a largest signal quality measurement among the beams having no scheduling constraint.

4. The terminal device of claim 3, wherein the constrained radio resources schedulable to the beam having the scheduling constraint are at least partially orthogonal to radio resources schedulable to the at least one interfering beam.

5. A radio access node device, comprising a processor and a memory in which contain instructions executable by the processor, causing the radio access node device to:
    send a configuration signaling to a terminal device that indicating scheduling constraint information of plural beams transmitted by the radio access node device, wherein the scheduling constraint information indicates, via a scheduling constraint indicator, whether each beam of the plural beams has a scheduling constraint, wherein a first plurality of the plural beams are indicated to have a scheduling constraint and a second plurality of the plural beams are indicated to have no scheduling constraint, and wherein a beam under the scheduling constraint is only allowed to be scheduled at a part of total available radio resources in coordination with at least one interfering beam;

select a serving beam from the plural beams by the terminal device based on the configuration signaling received; and communicate with the terminal device over a serving beam selected by the terminal device from the plural beams, wherein a predefined criterion on which the selecting the serving beam is partially based comprises the serving beam having a largest signal quality measurement among the beams having no scheduling constraint.

6. The radio access node device of claim 5, wherein constrained radio resources schedulable to the beam having the scheduling constraint are at least partially orthogonal to radio resources schedulable to the at least one interfering beam.

* * * * *